US009087070B2

(12) United States Patent
Francis

(10) Patent No.: US 9,087,070 B2
(45) Date of Patent: Jul. 21, 2015

(54) SYSTEM AND METHOD FOR APPLYING AN EFFICIENT DATA COMPRESSION SCHEME TO URL PARAMETERS

(71) Applicant: YAHOO! INC., Sunnyvale, CA (US)

(72) Inventor: Steve W. Francis, La Jolla, CA (US)

(73) Assignee: YAHOO! INC., Sunnyvale, CA (US)

(*) Notice: Subject to any disclaimer, the term of this patent is extended or adjusted under 35 U.S.C. 154(b) by 220 days.

(21) Appl. No.: 13/755,692

(22) Filed: Jan. 31, 2013

(65) Prior Publication Data

US 2014/0214779 A1    Jul. 31, 2014

(51) Int. Cl.
G06F 17/30    (2006.01)
(52) U.S. Cl.
CPC ................... *G06F 17/30153* (2013.01)
(58) Field of Classification Search
USPC .................................................. 707/693, 803
See application file for complete search history.

(56) References Cited

U.S. PATENT DOCUMENTS

| 4,876,541 | A  | * | 10/1989 | Storer ............................ 341/51 |
| 5,951,623 | A  | * | 9/1999  | Reynar et al. ................. 708/203 |
| 6,121,901 | A  | * | 9/2000  | Welch et al. .................... 341/51 |
| 6,404,362 | B1 | * | 6/2002  | York et al. .................... 341/106 |
| 6,529,912 | B2 | * | 3/2003  | Satoh et al. ................... 707/693 |
| 2009/0002207 | A1 | * | 1/2009  | Harada et al. .................. 341/51 |
| 2010/0302078 | A1 | * | 12/2010 | Schuessler ..................... 341/90 |
| 2011/0107190 | A1 | * | 5/2011  | Henderson et al. ........... 714/798 |
| 2012/0130965 | A1 | * | 5/2012  | Oh ............................... 707/693 |

* cited by examiner

*Primary Examiner* — Hares Jami
(74) *Attorney, Agent, or Firm* — James J. DeCarlo; Greenberg Traurig, LLP

(57) ABSTRACT

Disclosed is a system and methods for data compression and decompression. The systems and methods discussed herein include an encoder, dictionary, decoder, literal string and control output. The discussed systems and methods encode data transmitted over a communications channel through the use of a dynamically compiled dictionary. Upon reviewing the characters within the transmitted data in view of the dictionary, an encoded/compressed output string is created. Such output string may also be decoded in a similar fashion via a dynamically compiled dictionary.

19 Claims, 10 Drawing Sheets

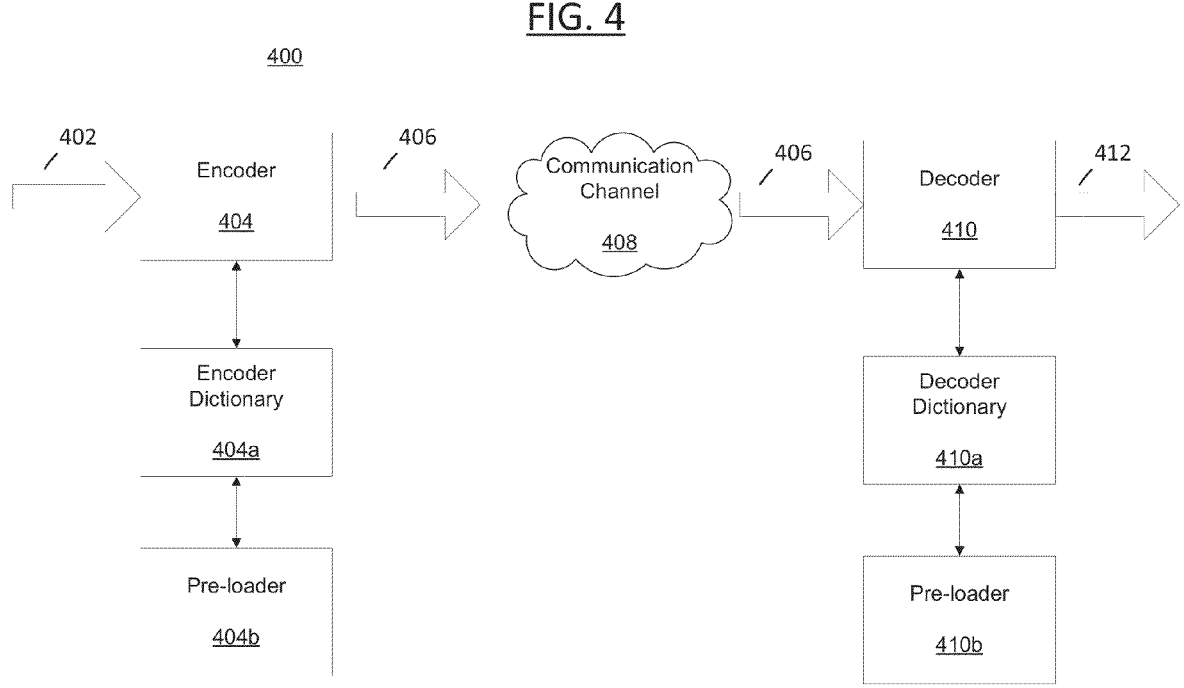

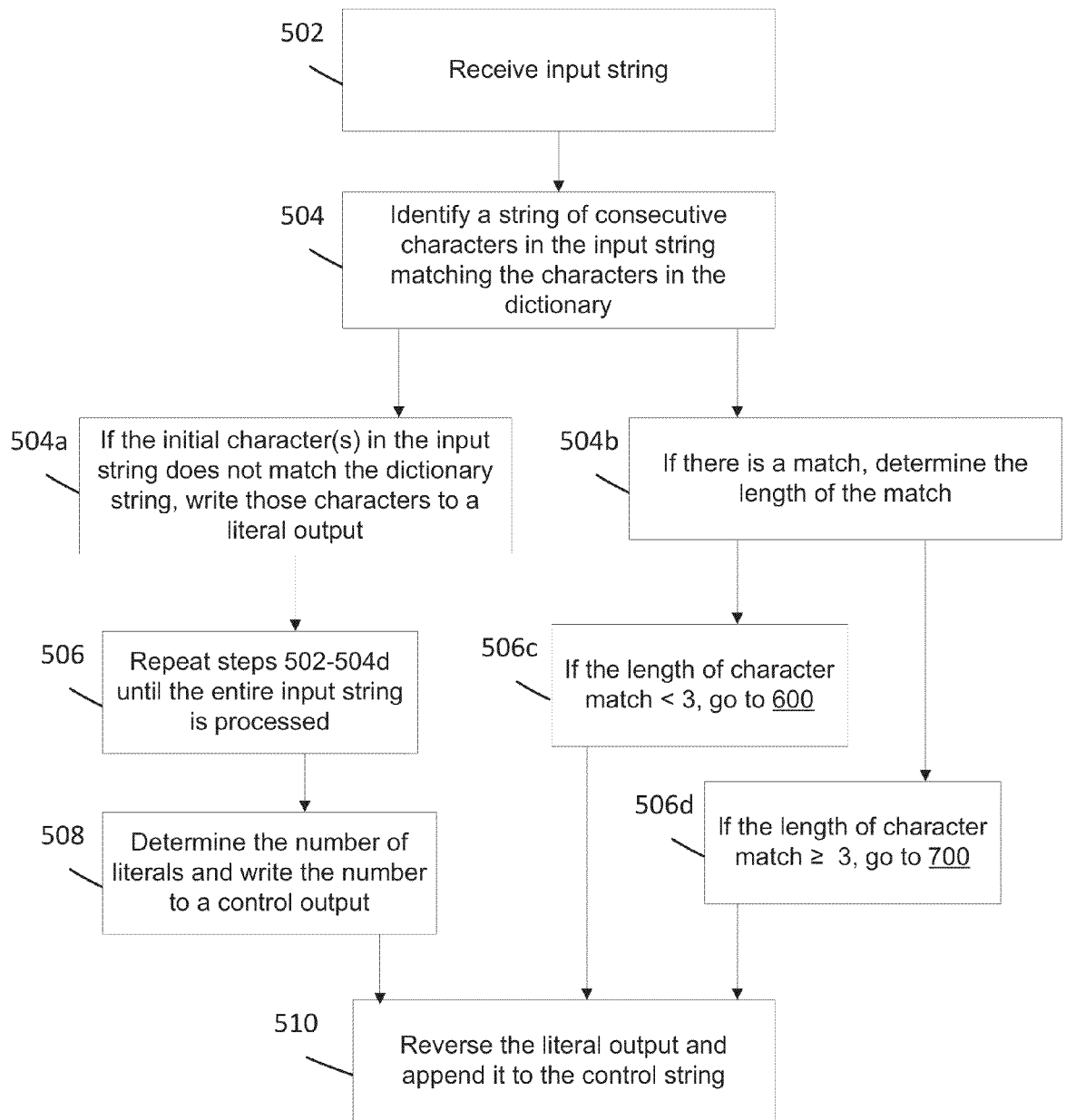

602 Is the longest match less than 3 characters in length? — no → Go to 700 yes ↓

604 Write the input characters individually to the dictionary and to the literal output

↓

606 If the dictionary is longer than 128 characters upon writing to the dictionary, remove the first character from the dictionary string

↓

608 Go to Step 504

702 — Determine that the match is greater than or equal to 3 characters in lenght 704 — Write the number of literals written since the last dictionary match to the control output 706 — Write the characters identified in the match between the input string and the dictionary string to the control output 708 — Go to Step 504

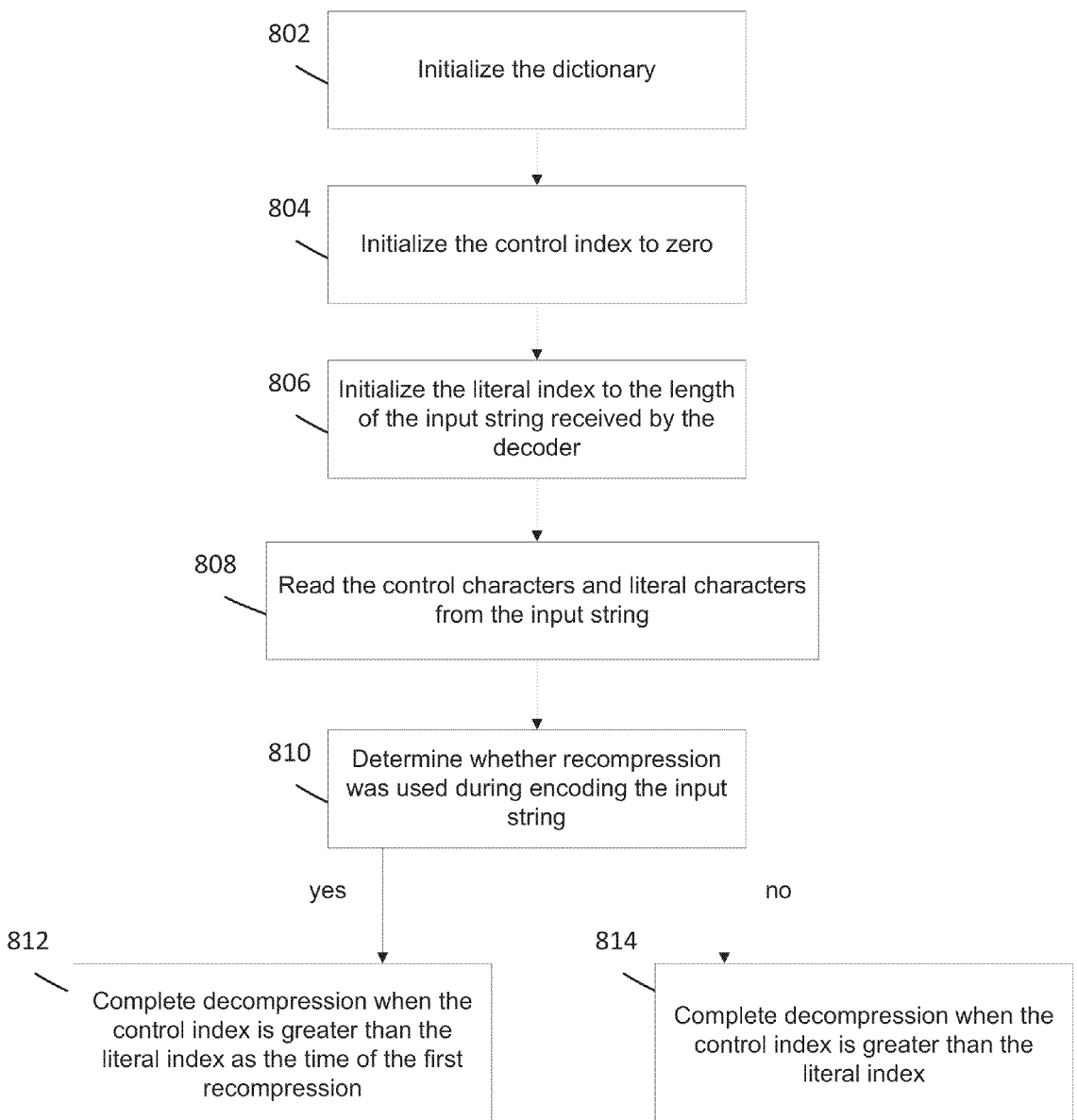

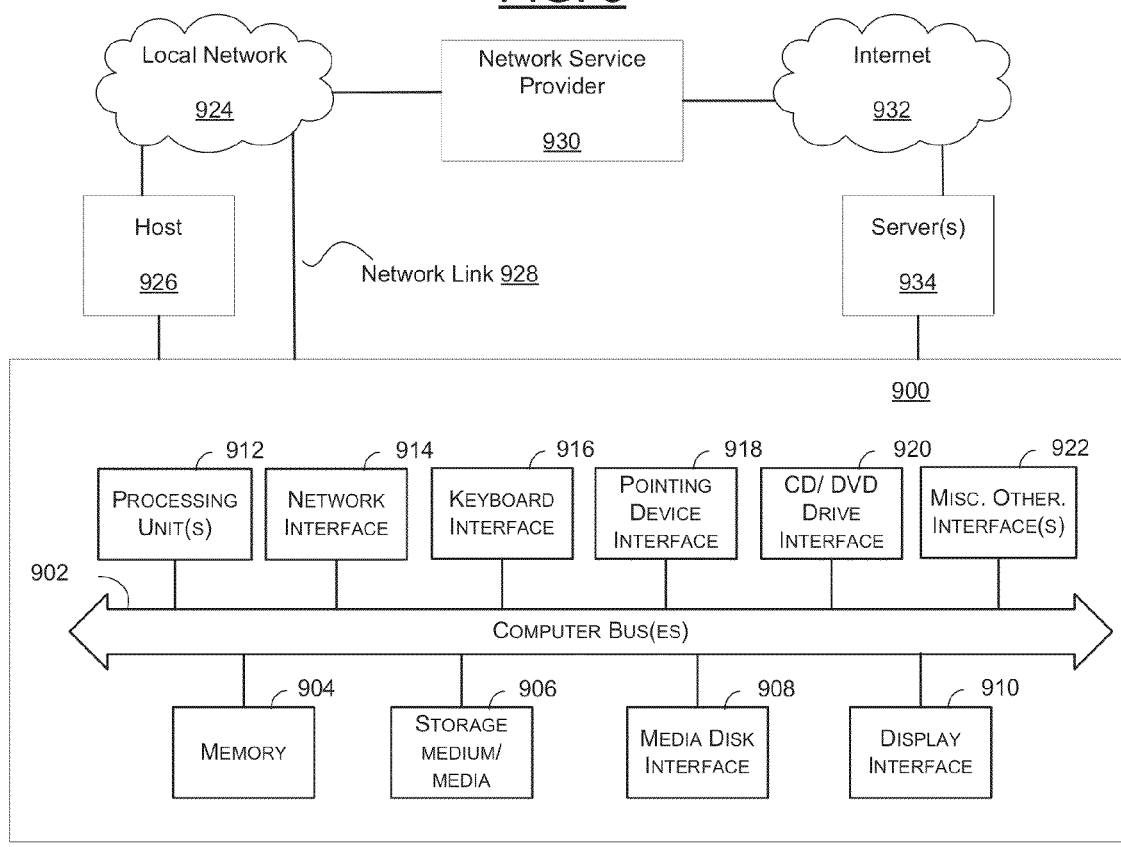

SYSTEM AND METHOD FOR APPLYING AN EFFICIENT DATA COMPRESSION SCHEME TO URL PARAMETERS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to a system and method for performance optimization and traffic processing within web communications, and more particularly, to a system and method that optimizes requests directed to and originating from websites by compressing and decompressing URL parameters.

RELATED ART

Conventionally, data compression systems can use dynamically compiled dictionaries. In such systems, an input data stream is compared with strings stored in a dictionary. When characters from the data stream have been matched to a string in the dictionary the code for that string is read from the dictionary and transmitted in place of the original characters. At the same time when the input data stream is found to have character sequences not previously encountered and not stored in the dictionary, the dictionary is updated by making a new entry and assigning a code to the newly encountered character sequence. This process is duplicated on the transmission and reception sides of the compression system. The dictionary entry is commonly made by storing a pointer to a previously encountered string together with the additional character of the newly encountered string.

SUMMARY

The present disclosure addresses failings in the art by providing a system and method for compressing URL parameters thereby providing a reliable and efficient manner to ensure that a maximum amount of data for a request can be communicated. That is, there are many data compression and encoding methods and apparatus known today. Due to the ever-increasing need to transmit and/or store greater and greater amounts of data, however, there is continued demand for increasingly improved data compression and encoding, both in terms of improved speed and reduced memory requirements, and above all in terms of greater compression efficiency.

In accordance with one or more embodiments, a method is disclosed which includes receiving, at a computing device, an input data string, the input data string comprising a plurality characters; initializing, via the computing device, a dictionary with a plurality of characters based in part upon the input data string; encoding the input data string based in part upon the dictionary, said encoding comprises: comparing, via the computing device, the characters of the input data string with the characters of the dictionary, said comparing comprising sequentially traversing the input data string and the dictionary, and comparing each character in the input data string with each dictionary character; identifying, via the computing device, a first string, said first string identified by determining a match between at least one consecutive character in the input data string and at least one character in the dictionary; writing, via the computing device, the first string to a control output string; identifying, via the computing device, a second string, said second string comprising at least one consecutive character in the input data string not present within the dictionary; writing, via the computing device, the second string to a literal output string; and generating, via the computing device, an encoded output string based on the control output string and the literal output string.

In accordance with one or more embodiments, a method is disclosed which includes initializing, via a computing device, a dictionary with a character string based in part upon an encoded character string, the encoded character string comprising control characters and literal characters; initializing, via the computing device, a control index to zero; determining, via the computing device, the length of the encoded character string; initializing, via the computing device, a literal index to the determined length of the encoded character string; reading, via the computing device, the encoded character string, said reading comprises identifying and reading the control characters and the literal characters, said control characters are read from the beginning of the encoded character string, wherein the control index is updated in relation to each control character read, said literal characters are read from the end of the encoded character string, wherein the literal index is updated in relation to each literal character read; and decompressing, via the computing device, the encoded character string based upon said reading of the encoded character string, wherein said decompression is complete when the control index is greater than the literal index.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for compressing (and decompressing) URL parameters thereby providing a reliable and efficient manner to ensure that a maximum amount of data for a request can be communicated.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a system diagram illustrating an exemplary system, which can employ data compression with a dictionary pre-load of a set of expected character strings, according to some embodiments of the present disclosure;

FIG. 5A is a flow diagram illustrating data compression in accordance with some embodiments of the present disclosure;

FIG. 6 is a flow diagram illustrating data compression in accordance with some embodiments of the present disclosure;

FIG. 7 is a flow diagram illustrating data compression in accordance with some embodiments of the present disclosure;

FIG. 8 is a flow diagram illustrating data decompression in accordance with some embodiments of the present disclosure; and FIG. 9 is a block diagram illustrating architecture of a hardware device in accordance with one or more embodiments of the present disclosure.

DESCRIPTION OF EMBODIMENTS

Figure 1:
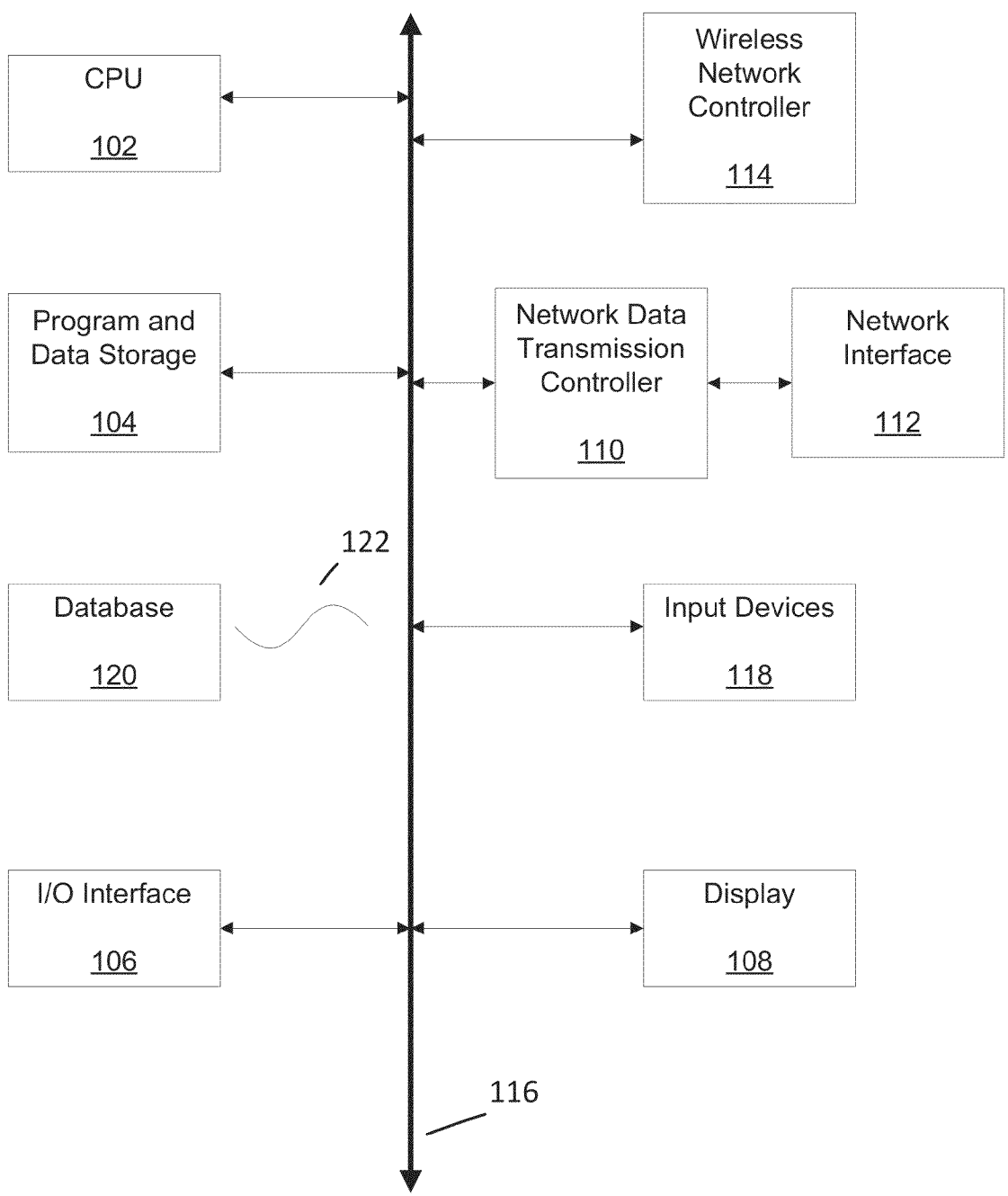
FIG. 1 depicts an example of a system architecture according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

By way of background to the present disclosure, data compression algorithms are generally known in the art. Conventional data compression algorithms compress a stream of digital data signals (uncompressed bits) into a compressed digital data signal (compressed bits). Such compression requires less bandwidth, which allows for fewer bits allocated during communication. Subsequently, conventional compression algorithms then decompress the compressed digital data signals back into the original signals or a close approximation thereof. Some algorithms can be referred to lossless data compression systems which decompress the compressed digital signal back into the original data signals exactly.

Examples of known data compression algorithms include the Mayne algorithm, which predates the Lempel Ziv (LZ77 and LZ78) algorithms. As with the Lempel Ziv (LZ) algorithms, the Mayne algorithm represents a sequence of input symbols through the use of a dictionary. The dictionary includes a compilation of known strings, where each entry has a corresponding index number (or codeword). With these algorithms, an encoder will match the longest string of input symbols with a dictionary entry, and transmit the index number of the dictionary entry. A decoder receives the index number, looks up the entry in its dictionary, and recovers the string.

Another compression algorithm is DEFLATE. DEFLATE is a variation on the LZ algorithms, and is optimized for decompression speed and compression ratio, but compression can be slow. DEFLATE is a lossless data compression algorithm that uses a combination of the LZ77 algorithm and Huffman coding. Huffman coding involves the use of a variable-length code table for encoding a source symbol (such as a character in a file) where the variable-length code table has been derived in a particular way based on the estimated probability of occurrence for each possible value of the source symbol. Huffman coding is equivalent to simple binary block encoding, e.g., ASCII coding. Although Huffman's original algorithm is optimal for a symbol-by-symbol coding (i.e. a stream of unrelated symbols) with a known input probability distribution, it is not optimal when the symbol-by-symbol restriction is dropped, or when the probability mass functions are unknown, not identically distributed, or not independent (e.g., "cat" is more common than "cta"). Further, although the DEFLATE and the LZ algorithms are adaptive, they represent a redundant character string by a compressed code after encountering the character string within an input data stream at least twice. Such algorithms do not take advantage of character strings that can be expected to appear only once or a few times per input data stream.

The preferred embodiments of the present disclosure will now be described with reference to FIGS. 1-9. The present disclosure, according to an exemplary embodiment, utilizes JavaScript® and CSS frameworks to handle digital data signals or character strings, e.g., URLs or URIs. Examples of JavaScript frameworks are Yahoo!® User Interface (YUI) or Dojo™, among others. Generally, a framework is an abstraction in which common code providing generic functionality can be selectively overridden or specialized by code providing specific functionality. Frameworks are a special case of software libraries in that they are reusable abstractions of code wrapped in a well-defined application programming interface (API), yet they contain some key distinguishing features that separate them from normal libraries. Among these distinguishing features are inversion of control (e.g., in a framework, unlike in libraries or normal user applications, the overall program's flow of control is not dictated by the caller, but by the framework), default behavior (e.g., a framework has a default behavior), extensibility (e.g., a framework can be extended by the user usually by selective overriding or specialized by user code providing specific functionality), and non-modifiable framework code (e.g., framework code, in general, is not allowed to be modified; users can extend the framework, but not modify its code). An exemplary embodiment of such a framework is the Yahoo! User Interface Library. YUI is an open-source JavaScript and CSS library for building richly interactive web applications using techniques such as Ajax, DHTML and DOM scripting. YUI also includes several core CSS resources.

The present disclosure provides systems and methods for applying an efficient data compression scheme to URLs. One objective and resulting effect of the systems and methods discussed herein is to effect a savings in an amount of storage required to hold the data or the amount of time (or bandwidth) required to transmit the data. By decreasing required space for data storage or required time (or bandwidth) for data transmission, data compression results in a monetary and resource savings. A compression ratio is defined as the ratio of the length of the data in the alternative data form (compressed data) to the length of the data originally (original data). Thus defined, the smaller the compression ratio, the greater will be the savings in storage, time, or bandwidth, so as to additionally substantially reduce the computation time required for performing (lossless) data compression. Another preferred objective, in accordance with preferred embodiments of the present disclosure, includes an input data string, e.g., a URL, being compressed and decompressed resulting in a valid URL. That is, upon decompressing the encoded string, the result is a valid URL. Additionally, the present disclosure improves stability and performance during URL compression. Also, there are no code changes required for users of YUI and the combo handler.

As known in the art, web page communications involve communicating information back and forth with a web page. Every web site can be made up of one or more web pages and the content for the web pages can be written in a HyperText Markup Language (HTML), a language that governs how web pages are formatted and displayed. Hypertext Transfer Protocol (HTTP) can define how HTML pages are formatted and transmitted and what actions a web browser and web server can take in response to various HTTP requests. For example, entering a Uniform Resource Locator (URL) into a web browser sends an HTTP request to a web server directing it to obtain and transmit the desired page.

A URL (or URI) is used to reference resources on the Internet and can consist of a protocol identifier and a resource name. The protocol identifier can indicate the name of the protocol that is being used to obtain a resource, for example, HTTP, FTP, File, News, Gopher, and the like. The resource name can include a host name, filename, port number, reference, and the like. The host name is the name of the machine where the resource can be located and the filename is the pathname to the file on the machine. The port number is the port that the request can connect to and the reference can identify a specific location within a file.

When a web client using a web browser submits information to a web server, this information can be appended to the URL and sent to the web server. However, many web browsers may have a limit on the number of characters that can be used for an HTTP request. Different browsers may have different restrictions on the URL length. For example, if a web client wants to create a new record and the amount of characters exceed a maximum amount, then the web client or server may no longer respond. Accordingly, in view of the above, the present disclosure discusses compressing and decompressing request parameters in order to ensure that a web browser (running under a JavaScript/CSS framework—e.g., YUI) is running in an efficient and effective manner.

Turning to FIG. 1, an exemplary computer system 100 is depicted for implementing the systems and methods of the present disclosure. FIG. 1 shows an example of a computer system 100 which may implement the method and system of the present disclosure. The systems and methods of the present disclosure may be implemented in the form of a software application running on a computer system, for example, a mainframe, personal computer (PC), handheld computer, server, and the like. The software application may be stored on a recording media locally accessible by the computer system, for example, floppy disk, compact disk, hard disk, and the like, or may be remote from the computer system and accessible via a hard wired or wireless connection to a network, for example, a local area network, or the Internet. The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

The computer system 100 can include a central processing unit (CPU) 102, program and data storage devices 104, an I/O interface (e.g., printer interface) 106, a display unit 108, a network data transmission controller 110, a network interface 112, a wireless network controller 114, an internal bus 116, and one or more input devices 118 (for example, a keyboard, mouse, touch screen, controller, and the like). As shown, the system 100 may be connected to a database 120, via a link 122 (or the database 120 may be directly associated with the system 100).

Figure 2:
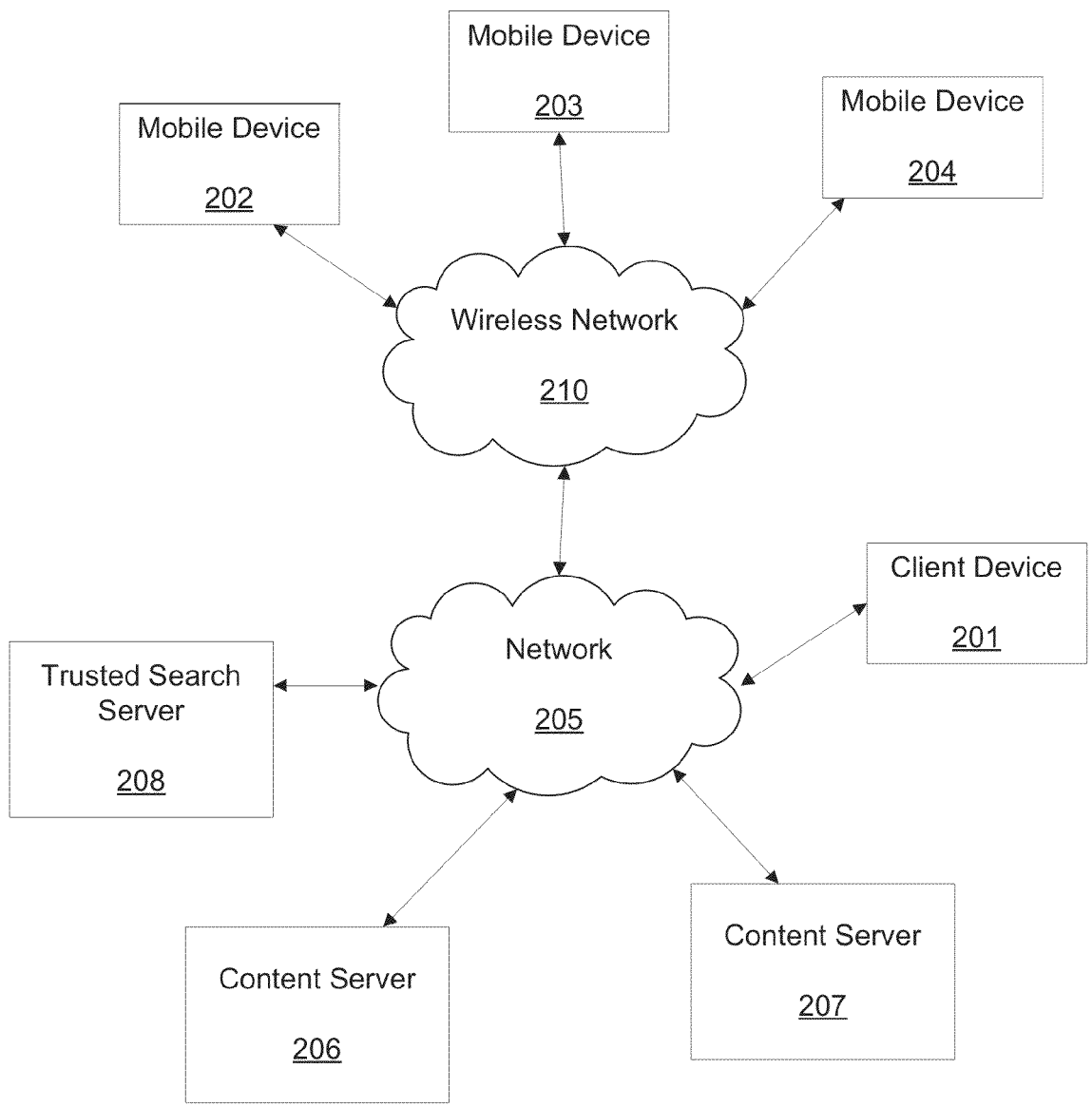
FIG. 2 is a schematic diagram illustrating an example of a network within which the systems and methods disclosed herein could be implemented according to some embodiments of the present disclosure

FIG. 2, in accordance with the system 100 of FIG. 1, shows components of a general environment in which the systems and methods discussed herein may be practiced. Not all the components may be required to practice the disclosure, and variations in the arrangement and type of the components may be made without departing from the spirit or scope of the disclosure. As shown, system 200 of FIG. 2 includes local area networks ("LANs")/wide area networks ("WANs")—network 205, wireless network 220, mobile devices (client devices) 202-204 and client device 202. It should be understood that the computer system 100 discussed above in FIG. 1 equates to the devices 201-204. FIG. 2 additionally includes a variety of servers, such as content servers 206-207 and trust search server (TSS) 208.

One embodiment of mobile devices 202-203 is described in more detail below. Generally, however, mobile devices 202-204 may include virtually any portable computing device capable of receiving and sending a message over a network, such as network 205, wireless network 220, or the like. Mobile devices 202-204 may also be described generally as client devices that are configured to be portable. Thus, mobile devices 202-204 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 202-204 may uniquely identify themselves through any of a variety of mechanisms, including a phone number, Mobile Identification Number (MIN), an electronic serial number (ESN), or other mobile device identifier.

Mobile devices 202-204 may also be configured to communicate a message, such as through Short Message Service (SMS), Multimedia Message Service (MMS), instant messaging (IM), internet relay chat (IRC), Mardam-Bey's IRC (mIRC), Jabber, email, or the like, between another computing device or server. However, the present disclosure is not limited to these messaging protocols, and virtually any other messaging protocol may be employed.

Mobile devices 202-204 may be configured further to include a client application that enables the end-user to log into an end-user account that may be managed by another computing device, such as content server 206, messaging server 207 and/or application server 208. Such end-user account, for example, may be configured to enable the end-user to receive emails, send/receive IM messages, SMS messages, access selected web pages, or the like. However, the disclosure is not constrained, and in one embodiment, the end-user might not need to log into an account to send/receive messages.

In some embodiments, mobile devices 202-204 may also communicate with non-mobile client devices, such as client device 202, or the like. In one embodiment, such communications may include sending and/or receiving messages, share photographs, audio clips, video clips, or any of a variety of other forms of communications. Client device 202 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 202 may also have differing capabilities for displaying navigable views of information.

Client devices 202-204 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 220 is configured to couple mobile devices 202-204 and its components with network 205. Wireless network 220 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Wireless network 220 may further include an autonomous system of terminals, gateways, routers, and the like connected by wireless radio links, and the like. These connectors may be configured to move freely and randomly and organize themselves arbitrarily, such that the topology of wireless network 220 may change rapidly. Wireless network 220 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 202-204 with various degrees of mobility. For example, wireless network 220 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 220 may include virtually any wireless communication mechanism by which information may travel between mobile devices 202-204 and another computing device, network, and the like.

Network 205 is configured to couple messaging server 207, content server 206, application server 208, or the like, with other computing devices, including, client device 202, and through wireless network 220 to mobile devices 202-204. Network 205 is enabled to employ any form of computer readable media for communicating information from one electronic device to another. Also, network 205 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T2, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 205 includes any communication method by which information may travel between content server 206, messaging server 207, application server 208, client device 202, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, and the like that may route the signal packet in accordance with a target address and availability of a network path to the target address.

In some embodiments, the disclosed networks 220 and/or 205 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

The content servers 206-207 may include a device that includes a configuration to provide content via a network to another device. The content servers 206-207 may, for example, host a site, such as a social networking site, or a personal user site (such as a blog, vlog, online dating site, and the like). The content servers 206-207 may also host a variety of other sites, including, but not limited to business sites, educational sites, dictionary sites, encyclopedia sites, wikis, financial sites, government sites, and the like. Devices that may operate as content server 206 include personal computers desktop computers, multiprocessor systems, microprocessor-based or programmable consumer electronics, network PCs, servers, and the like.

Content servers 206-207 can include virtually any computing device that is configured to provide one or more messaging services. For example, content servers 206-207 may provide Instant Messaging (IM) services, email services, VOIP services, SMS services, FTP services, or the like. Content servers 206-207 may be implemented on a variety of computing devices including personal computers, desktop computers, multiprocessor systems, microprocessor-based devices, network PCs, servers, network appliances, or the like. Moreover, although content servers 206-207 is illustrated as single network devices, respectively, the disclosure is not so limited. For example, one or more of content servers may also be implemented using a plurality of network devices to provide the various content services. According to some embodiments, content servers 206-207 may be configured to receive messages from a sending device, such as client devices 202-204, or the like, and provide the message, and/or a copy of the message to content server 206 for analysis. Furthermore, content server 206 may similarly receive a link to context, in one embodiment, from content server 207, and provide the link or link information along with a response message to the original sending device. In another embodiment, content servers 206 may forward the response message to content server 207, and receive the response message, or a response message modified with the link information to the contextual message.

TSS Server 208 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by the servers 206, 207 and 208, which may include, in a non-limiting example, social networking services servers, SMS servers, IM servers, MMS servers, email servers, exchange servers, photo-sharing services servers, and travel services servers, via the network 205 using their various devices 202-204. Moreover, although FIG. 2 illustrates servers 206-208 as single computing devices, respectively, the disclosure is not so limited. For example, one or more functions of content servers 206-207 and/or server 208 may be distributed across one or more distinct computing devices. Moreover, in one embodiment, content servers 206-207 and server 208 may be integrated into a single computing device, without departing from the scope of the present disclosure.

Figure 3:
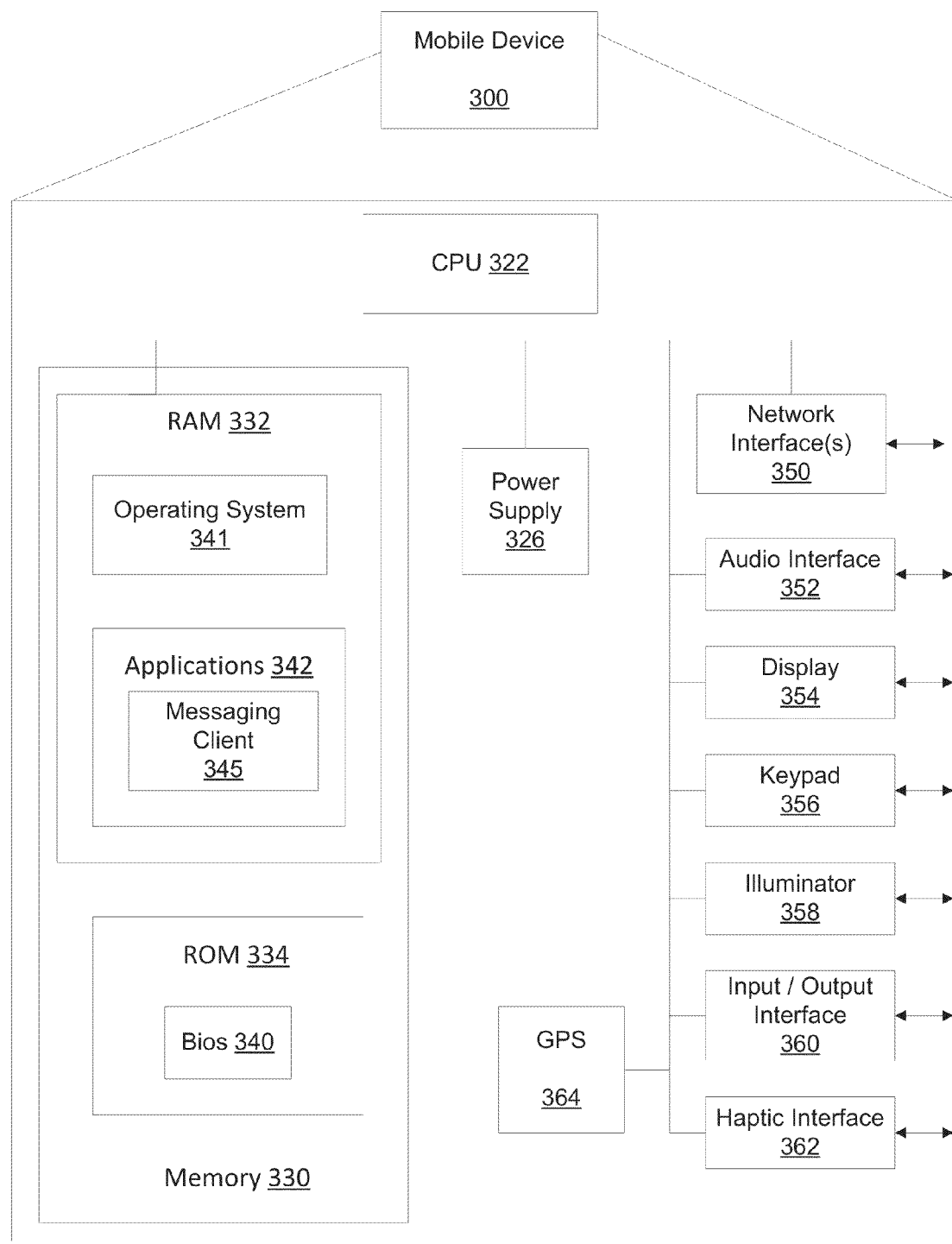
FIG. 3 depicts is a schematic diagram illustrating a client device in accordance with some embodiments of the present disclosure.

FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices 201-204 discussed above in relation to FIG. 2.

As shown in the figure, Client device 300 includes a processing unit (CPU) 322 in communication with a mass memory 330 via a bus 324. Client device 300 also includes a power supply 326, one or more network interfaces 350, an audio interface 352, a display 354, a keypad 356, an illuminator 358, an input/output interface 360, a haptic interface 362, and an optional global positioning systems (GPS) receiver 364. Power supply 326 provides power to Client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 350 includes circuitry for coupling Client device 300 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 350 is sometimes known as a transceiver, transceiving device, or network interface card (NIC).

Audio interface 352 is arranged to produce and receive audio signals such as the sound of a human voice. For example, audio interface 352 may be coupled to a speaker and microphone (not shown) to enable telecommunication with others and/or generate an audio acknowledgement for some action. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. For example, keypad 356 may include a push button numeric dial, or a keyboard. Keypad 356 may also include command buttons that are associated with selecting and sending images. Illuminator 358 may provide a status indication and/or provide light. Illuminator 358 may remain active for specific periods of time or in response to events. For example, when illuminator 358 is active, it may backlight the buttons on keypad 356 and stay on while the client device is powered. Also, illuminator 358 may backlight these buttons in various patterns when particular actions are performed, such as dialing another client device. Illuminator 358 may also cause light sources positioned within a transparent or translucent case of the client device to illuminate in response to actions.

Client device 300 also comprises input/output interface 360 for communicating with external devices, such as a headset, or other input or output devices not shown in FIG. 3. Input/output interface 360 can utilize one or more communication technologies, such as USB, infrared, Bluetooth™, or the like. Haptic interface 362 is arranged to provide tactile feedback to a user of the client device. For example, the haptic interface may be employed to vibrate client device 300 in a particular way when the Client device 300 receives a communication from another user.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, triangulation, assisted GPS (AGPS), E-OTD, CI, SAI, ETA, BSS or the like, to further determine the physical location of Client device 300 on the surface of the Earth. It is understood that under different conditions, GPS transceiver 364 can determine a physical location within millimeters for Client device 300; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 330 further includes one or more data stores, which can be utilized by Client device 300 to store, among other things, applications 342 and/or other data. For example, data stores may be employed to store information that describes various capabilities of Client device 300. The information may then be provided to another device based on any of a variety of events, including being sent as part of a header during a communication, sent upon request, or the like. At least a portion of the capability information may also be stored on a disk drive or other storage medium (not shown) within Client device 300.

Applications 342 may include computer executable instructions which, when executed by Client device 300, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 342 may further include messaging client 345 that is configured to send, to receive, and/or to otherwise process messages using SMS, MMS, IM, email, VOIP, and/or any of a variety of other messaging communication protocols. Although a single messaging client 345 is illustrated it should be clear that multiple messaging clients may be employed. For example, one messaging client may be configured to manage SMS messages, where another messaging client manages IM messages, and yet another messaging client is configured to manage emails, or the like.

Turning to FIG. 4, system 400 illustrates data compression with a dictionary pre-load of a set of expected character strings according to some embodiments of the present disclosure. In FIG. 4, the system 400 includes an encoder 404 and encoder dictionary 404a (e.g., implemented via hardware and/or software) coupled via a communications channel 408 to a decoder 410 and decoder dictionary 410a (e.g., implemented via hardware and/or software).

For the purposes of this disclosure the encoder 404 and decoder 410 are software, hardware, or firmware (or combinations thereof) systems, processes or functionalities, or components thereof, that perform or facilitate the processes, features, and/or functions described herein (with or without human interaction or augmentation). An encoder and decoder can include sub-modules or engines. Software components of the encoder 404 and decoder 410 may be stored on a computer readable medium for execution by a processor(s). Encoders and decoders may be integral to one or more computing devices or servers, or be loaded and executed by one or more computing devices or servers. One or more encoders/decoders may be grouped into an engine, module or an application. The system 400 includes any suitable servers, workstations, personal computers (PCs), personal digital assistants (PDAs), Internet appliances, set top boxes, other devices, and the like, capable of performing the processes of the present disclosure.

In some embodiments, the system 400 may further include pre-loaders 404b and 410b (e.g., implemented via hardware and/or software) for pre-loading the sets of the expected character strings into the encoder and decoder dictionaries 404a and 410a, respectively. In some embodiments, as discussed in more detail below, the dictionaries 404a and 410a may be one dictionary, in that they are the same dictionary, or same character strings, utilized to perform the encoding and decoding (or compression and decompression). That is, the dictionaries 404a and 410a may be based upon each other in that the character strings in dictionary 404a may be utilized in dictionary 410a for decompression. In some embodiments, the dictionary 410a may contain character strings or information predicated upon the information learned and compiled during the encoding at encoder 404. Additionally, or in the alternative, the dictionaries can include initial character sets and/or pointers to such characters or individual characters. For example, each dictionary entry may consist of a pointer and a character which is linked to a parent entry. The parent entry can be derived from the input data 402, or from previous or common entries, which are derived from a network resource associated with maintaining the framework. Therefore, each entry, and subsequent new entry written into the dictionary can comprise an appropriate link pointer pointing to locations in memory allocated to the entry. Pre-loaders 404b and 410b can be modules, engines or applications utilized to perform the processes, features, and/or functionalities discussed herein, such as initializing the dictionaries 404a and 410a for encoding/compression and decoding/decompression, respectively.

The encoder 404 and the decoder 410 of the system 400 can communicate with each other using any suitable protocol, for example, via the communications channel 408 and the system 400 can be implemented using one or more of components discussed above in relation to FIGS. 1 and 2, for example. One or more interface mechanisms can be used in the system 400, for example, including Internet access, telecommunications in any form (e.g., voice, modem, Wi-Fi, NFC and the like), wireless communications media, and the like, via the communications channel 408. Accordingly, the communications channel 408 can include, for example, the Internet, an Intranet, a wireless communications channel, a satellite communications channel, a cellular communications channel, a hybrid communications channel, and the like. Thus, the communications channel 408 can be implemented via one or more communications channels (e.g., the Internet, an Intranet, a wireless communications channel, a satellite communications channel, a cellular communications channel, a hybrid communications channel, and the like), as will be appreciated by those skilled in the relevant art(s).

As discussed in more detail below in FIGS. 5-8, adaptive data compression/decompression algorithms can be employed in the encoder 404 and the decoder 410. Such algorithms allow the encoder 404 to write to the dictionary 404a while compression is occurring. That is, individual characters can be written to a dictionary as they are being compressed. In some embodiments, this enables a more efficient and adaptive decompression by the decoder 410 to produce the decoded output 412, as discussed in more detail below.

Such data compression algorithm, being adaptive, can represent a redundant character string (e.g., a character string appearing at least twice within the input data stream 402) by a compressed code that can be transmitted as compressed data 406 over communications channel 408 to the decoder 410. In some embodiments, since the algorithm included in the encoder 404 is adaptive, an initial state of the encoder dictionary 404a of character strings previously encountered by the encoder 404 may be empty. However, preferred embodiments, as discussed in more detail below, involve the encoder 404 having access to a dictionary 404a character string (in addition to a produced literal output and control output). In some preferred embodiments, the dictionary's size is 128 characters, as it is initialized with strings likely to be present in the input data 402. As the encoder 404 processes the input data 402, the encoder 404 can build the encoder dictionary 404a of character strings as they are received. To encode a character string with a compressed code, the character string is included in the encoder dictionary 404a.

As will be appreciated by those skilled in the art, the present disclosure is not limited to sets of data 402 which all have the same expected character strings (e.g., for pre-loading the dictionaries). For example, the expected character stings can be pre-loaded into the encoder dictionary 404a and the decoder dictionary 410a because the expected character strings typically appear in the data 402, even though the expected character strings do not always appear in the data 402. In addition, the expected character stings can be pre-loaded into the encoder dictionary 404a and the decoder dictionary 410a because a small set of character strings typically appears in the data 402. For example, the present disclosure can improve performance for web browsing by compressing HTTP headers used to retrieve objects associated with Internet and Intranet web pages.

Specifically, the HTTP uses ASCII character strings in its headers and many of the character strings that are used are common to many HTTP transactions. Examples of two of such common character strings are the HTTP version and the type of browser being used. For example, HTTP version strings, such as "HTTP Version: 1.0," HTTP Version: 1.1," and the like, may occur in almost every HTTP request and response. Similarly, several web browsers most commonly in use for web browsing are based on software developed by the Mozilla project. These browsers may insert a common browser type string (e.g., "Browser Type: Mozilla," and the like) into their HTTP requests. However, for both the HTTP version and the browser type, the expected character strings may only show up in a message once. Accordingly, by pre-loading such expected character strings into the encoder dictionary 404a and the decoder dictionary 410a, the present disclosure allows such character strings to be compressed when they are present in the data 402. By contrast, this may not be possible with other compression techniques.

The expected character strings that can be pre-loaded according to the present disclosure are not limited to character strings that are specific to the use of the HTTP, as will be appreciated by those skilled in the relevant art(s). For example, in the case of Internet and/or Intranet web pages, additional strings may be common for many or all of such web pages. As a non-limiting example, every object on every web page at a company's web site may include a common string (e.g., "URL:/www.example.com/intranet/") that may appear in the data 202, but only once.

Further, if it is known ahead of time (e.g., by YUI loader or a higher layer application, which is doing the web browsing) that certain character strings (e.g., "HTTP Version: 1.0", "HTTP Version: 1.1", "Browser Type: Mozilla", "URL:/www.example.com/intranet/", and the like) are expected to be contained in the data 402, then such expected character strings can be pre-loaded, via the pre-loaders 404b and 410b, into the encoder dictionary 404a and the decoder dictionary 410a. This advantageously results in improved compression ratios. Thus, compression/decompression then can be performed by the encoder 404 and the decoder 410 using the dictionaries 404a and 410a pre-loaded after initialization of the encoder dictionary 404a and the decoder dictionary 410a.

According to some embodiments, the encoder dictionary 404a and the decoder dictionary 410a can be pre-loaded with any character strings (e.g., "HTTP Version: 1.0", "HTTP Version: 1.1", "Browser Type: Mozilla", "URL:/www.example.com/intranet/", and the like, in the case of the data 402 coming from web browsing using HTTP) that may be expected to appear in the received data 402. Thus, the encoder dictionary 404a and the decoder dictionary 410a at the other end of the communications channel 408 can be pre-loaded with the same set of expected character strings (e.g., static character strings from a registration form, static HTTP character strings, and the like). Accordingly, in some embodiments, if the encoder dictionary 404a is pre-loaded with a set of expected character strings via the pre-loader 404b, then the decoder dictionary 410a is pre-loaded via the pre-loader 410b with a same set of expected character strings. As discussed below, the pre-loading of the decoder dictionary 410a can be based upon the pre-loaded encoder dictionary 404a after compression has occurred, which relates to the output from the encoder 404.

According to some embodiments, various methods can be employed by the pre-loaders 404b and 410b for pre-loading the dictionaries 404a and 410a. One embodiment includes sending the set of expected character strings through the encoder 404 and their compressed equivalents through the decoder 410 after an initialization of the dictionaries 404a and 410a. Another embodiment includes a pre-load function via the pre-loaders 404b and 410b for both the encoder 404 and the decoder 410 that pre-loads the dictionaries 404a and 410a with the set of expected character strings. Due to the nature of the way character strings are built and extended when processing input data 402, the result can create dictionaries 404a and 410a using fewer character entries or pointers related to such entries. Thus, this can create a better compression.

To support the pre-loading of the dictionaries 404a and 410a, the processes performed by the pre-loaders 404b and 410b can be included as part of or separately from the compression/decompression algorithms discussed below in relation to FIGS. 5-8. Such processes should not affect a basic operation of the compression/decompression algorithm so that the algorithm can support a normal operation (e.g., non-pre-loaded operation) and a pre-loaded operation alternately on a same data flow or simultaneously on different data flows using a separate dictionary. Thus, new processes for dictionary 404a and 410a pre-load can include pre-load of the encoder dictionary 404a, pre-load of the decoder dictionary 410a, re-initialization of the encoder pre-loaded dictionary 404a, re-initialization of the decoder pre-loaded dictionary 410a, and the like.

Figure 5B:
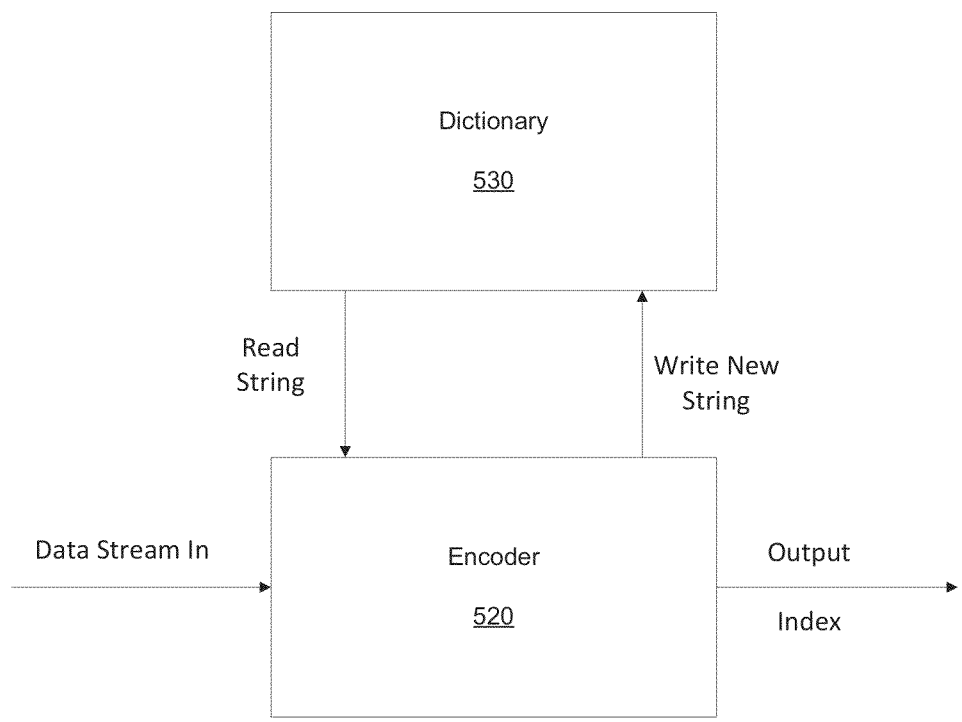
FIG. 5B is a block schematic diagram of a data compression system in accordance with some embodiments of the present disclosure.

FIG. 5A is a flow diagram illustrating a process (or encoding algorithm) 500 for encoding an input data string, such as a URL. FIG. 5B is a block schematic diagram illustrating the exemplary components performing the encoding (or compression) algorithm 500. As will be illustrated below, the encoding algorithm 500 achieves 3:1 compression. The encoding algorithm 500 is performed in accordance with, for example, a YUI framework, as discussed above. Within this process 500, four character strings are utilized: input string (e.g., URL to be compressed), the dictionary, the literal output string/index and the control output string/index.

As will become evident from the below discussion, the control signal is utilized to update the dictionary string upon comparison between the dictionary string and the URL. That is, the control string is compiled in accordance with the ongoing comparison between the URL and the dictionary with respect to characters identified as literals and written to the literal output. Literals, as known in the art, are referred to when there are character(s) in the URL not present in the dictionary. Within the control signal (or output), there are 82 characters which are legal and unambiguous in URLs. In a preferred embodiment, the legal characters are: 'ABCDEFGHIJKLMNOPQRSTUVWXYZabcdefghijklmnopqrstuvwxyz0123456789._!$&\'( )*+,-/:;<=>?@',. These characters, or alpha-numeric characters, are associated with the numbers 0 to 81, respectively. Characters numbered 64 through 80 indicate 1 to 17 literal characters. (As will become apparent from the below discussion, this is the number written in Step 704 in FIG. 7.) Characters 0 through 63 are the first byte of a 2 byte control sequence. There are 64 possible first characters and 82 possible second characters, for a total of 5248 possible 2 byte sequences. In order to calculate (or compile this number), the processes discussed herein subtracts 3 from the dictionary run length, multiplies the result by 128 and adds the result to the dictionary position. The result divided by 82 is the first character to write, and the result modulo 82 is the second character. Character 81 is the control character indicating recompression.

Turning back to FIG. 5A, the process 500 beings when an input string is received. Step 502. An example of an input string URL is: zz/combo?nq/ued/assets/css/global_4741.css. By way of non-limiting example, the input string is a URL for the sake of explanation herein; however, it should not be construed that a URL is an exhaustive example, or the only type of input/character string, or digital signal applicable to the system and methods discussed herein.

In Step 504, the longest string of consecutive characters in the input string is matched to the characters in the dictionary. That is, input string and the dictionary are sequentially traversed, and the characters in the input string are compared against the characters in the dictionary. For example, Dictionary string is: shared/common/used/assets/css/.css&-min.js&.

Here, to match the incoming string, the initial character in the input string is read and a search among the dictionary string is initiated. If the initial character(s) of the input string does not match the dictionary's initial characters, the character(s) of the input string are written to a literal output (or index). Step 504a. This is performed for the input string until a match for the input string is found in the dictionary string. For example, as discussed above:

URL is: zz/combo?nq/ued/assets/css/global_4741.css; and

Dictionary string is: shared/common/used/assets/css/.css&-min.js&.

Here, the first two characters in the URL are not found in the dictionary string: "zz". Therefore, they are written to the literal output, as in Step 504a. Next, the process 500 identifies a match between the URL and the dictionary. When a character is matched, the next input character is read and the process is repeated. In this manner the string "/com" is rapidly located. In this example, the characters "/", "c", "o" and "m" are consecutively matched. Thus, "/com" is matched. At this point, "/com" is the longest/current string in the dictionary that matches the current input, as in Step 504. The matching halts when consecutive matches are not identified. That is, when the encoder 520 in FIG. 5B attempts to locate the next character in the URL string, e.g., "b", it is immediately apparent that the character "b" is not the next character (or not in) the dictionary 530. This process is repeated until the entire input data sting has been read (or processed).

In Step 504b, the process determines the length of the identified match. If the match has a character length of less than 3, turn to process 600 as discussed in FIG. 6. Step 504c. If the match has a character length of equal to or greater than 3, turn to process 700 in FIG. 7. Step 504d. It should be understood that the character length determinate of 3 is not exhaustive. That is, the character length can be any number, which can be predetermined by a user, system, algorithm or some combination thereof, or can be adjusted by a user, system or algorithm accordingly during the process 500. Such adjustment may be based upon a system environment and/or to increase efficiency, cost or bandwidth.

Turning to FIG. 6, the process 600 begins with the determination that the match is less than 3 characters in length. Step 602. As such, the input characters are individually written to the dictionary and to the literal output. Step 604. In Step 606, if the dictionary is longer than 128 characters upon writing a character to the dictionary, remove the first character from the dictionary string. After writing all the matched characters, the process returns to Step 504. Step 608. In some embodiments, the characters are written to the dictionary for subsequent "rounds" of traversal through the input string in order to completely compress the input string based on an adaptive dictionary string.

Turning to FIG. 7, the process 700 begins with the determination that the match is greater than or equal to 3 characters in length. In Step 704, the number of literals written since the last dictionary match is written to the control output. This only occurs of the number of literals identified is greater than zero. From the above example, the literals were "zz"; therefore the code written to the control output indicates "2 literals." In Step 706, the characters identified in the match between the URL and dictionary string are written to the control output. After writing all the matched characters, the process returns to Step 504. Step 708.

Turning back to process 500 in FIG. 5, in Step 506, the above steps are repeated until the entire input string has been processed. That is, Steps 502-504, 504a-d are performed on the input string until the entire character string has been evaluated using the above steps. In Step 508, the number of literals is written to a control output. This occurs only if the literals are greater than zero. That is, if there are no literals identified, then there is no need to write anything to the control output. In some embodiments, Step 508 involves recompression. Recompression includes writing the number of literals to the control output that have occurred since the last dictionary match. Should literals be identified since the last match, the above steps are repeated as in Step 506. Upon processing the entire input string, in Step 510 the literal string is reversed and appended to the control string, which results in the compression output (or encoded URL). Therefore, the compression output is the compressed input string (referred to as the "Final Output" in the below examples; this "Final Output" is the initialized string in the decoding process discussed below in relation to FIG. 8). Note that, there is no marker between the control string and the literal string upon concatenation in Step 510.

Here, in the example, the literals are "zz". Therefore, upon being written to the control output, the literals are written according to the number of characters: 2 characters. That is, the "zz" is converted to an alpha-numeric representation: "2." Additionally, the control output is written with information related to the matching strings identified in Step 504. From the above example, the matched string is "/com". In order to properly identify the matched string, the number of bits (or positions in the character string) is counted from the end of the (current) dictionary string. That is, control output is converted to an alpha-numeric representation such that, e.g., the "/com" string begins 37 characters from the end of the dictionary string and is 4 characters long. Thus, the control is written in accordance with the matched characters as "37, 4".

For example:
shared/common/used/assets/css/.css&-min.js&—the "d" is 37 characters from the end, and "/com" is identified by the next 4 characters.

Therefore, in view of the above process, the control signal is written, in view of the matched strings and the literal output, as 237,4—which represents: "zz/com". Thus, the control output is appended to the dictionary string, whereby the dictionary string, previously: shared/common/used/assets/css/.css&-min.js&, becomes:

shared/common/used/assets/css/.css&-min.js&zz/com.

Therefore, the dictionary can be dynamically updated. The process 500 repeats for the remainder of the input string by determining literals and matches for the input data string, e.g., URL. However, for each repeated traversal through the steps of process 500, or "next round" through the process 500, the updated dictionary is utilized as discussed above and illustrated in the below examples.

In order to clearly illustrate the encoding algorithm 500 (which also includes the steps discussed in the processes 600 and 700 of FIGS. 6-7), below find an example depicting the steps in accordance with the URL and dictionary sting discussed above. The example embodies an exemplary embodiment of compressing a URL input string by the encoding algorithm 500; the below example shows the steps of processing an input URL in view of a pre-loaded dictionary string.

Initial Strings
URL: zz/combo?nq/ued/assets/css/global__4741.css
Dictionary: shared/common/ued/assets/css/.css&-min.js&
Round 1 (perform the processes of FIGS. 5-7)
URL: zz/combo?nq/ued/assets/css/global__4741.css
Control: 2 37,4
Literal: zz
Updated Dictionary (which is used as reference dictionary for Round 2):
shared/common/ued/assets/css/.css&-min.js&zz/com
Round 2 (repeat the processes of FIGS. 5-7)
URL: zz/combo?nq/ued/assets/css/global__4741.css
Control: 2 37,4 5 39,16
Literal: zzbo?nq
Updated Dictionary (which is used as reference dictionary for Round 3):
shared/common/ued/assets/css/.css&-min.js&zz/combo?nq/ued/assets/css/
Round 3 (Repeat the Processes of FIGS. 5-7)
URL: zz/combo?nq/ued/assets/css/global__4741.css
Control: 2 37,4 5 39,16 11 50,4
Literal: zzbo?nqglobal__4741
Updated Dictionary: shared/common/ued/assets/css/.css&-min.js&zz/combo?nq/ued/assets/css/global__4741.css
Final Output: $Re(S1/Xm1474_labolgqn?obzz As discussed above, the literal output is reversed and appended to the control output to produce the Final Output (or compressed URL).

Turning to FIG. 5B, as a non-limiting clarifying example in accordance with the above discussion, solely for illustrative purposes of the process/encoding algorithm 500, below is an example of processing a simple input string utilizing a dictionary string in accordance with the present disclosure. The data compression system of FIG. 5B comprises a dictionary 530 and an encoder 520 arranged to read characters of an input data stream, to search the dictionary 530 for the longest stored string which matches a current string in the data stream, and to update the dictionary 530. As an example, the encoder of 520 performs the following steps where the dictionary 530 contains the string "bcat" and the input string contains the string "acat". The process, which is an embodiment of the steps from encoding algorithm 500 in FIG. 5A, is as follows:

(1) Read "a" from the input;
(2) Search the dictionary for "a";
(3) Identify that there is no match, and write "a" to the literal output;
(3a) since the literal output is 1 character, the number of literals is 1, which is written to the control output;
(4) Read "c" from the input;
(5) Search and identify "c" as a match in the dictionary.
(6) Read "a" from the input;
(7) Search and identify "a" as a match in the dictionary.
(8) Read "t" from the input;
(9) Search and identify "t" as a match in the dictionary.
(10) Reaching the end of the string (or as discussed above, concluding a string of matches, which could be a single matching character), the matching string is written to the control output.
(11) The match is written as follows: 4,3 (where counting 4 places/bits/characters from the end of the dictionary string, then identifying the next 3 characters). Therefore, the control signal is written as: 1 4,3 (1—literal; 4,3 match string).
(12) The control signal is then written to the dictionary by appending the control signal characters at the end of the dictionary string. The result of such writing is that the dictionary is updated from "bcat" to "bcatacat".

As illustrated above, data compression is applied upon receiving an input signal, within a JavaScript framework such as YUI. As a result, the YUI loader (or combo handler) automatically decompresses the URL. FIG. 8 depicts the process 800 for data compression in accordance with some embodiments of the present disclosure. Data decompression is performed in accordance with decoder 410 from FIG. 4. The decoder performing the decompression accepts characters and performs the equivalent string matching function(s) discussed above in FIGS. 5-7. Thus, in some embodiments, the decoder actually contains a copy of the encoder function. Accordingly, the input string received at the decoder is the output stream (or Final Output from the above examples) produced by the encoding algorithm 500.

In Step 802, the decompression process begins with the initialization of the dictionary. In preferred embodiments, the dictionary's size is 128 characters, as it is initialized with strings likely to be present in the input data received from the encoder (the "Final Output from FIG. 5A). That is, the dictionary is initialized with respect to expected values from the output from the encoding algorithm 500 (or an encoded data string). In some embodiments as discussed above, the decoder dictionary 410a is the same library as the encoder dictionary 410a. In Step 804, the control index is initialized to zero. The control index is updated upon reading control characters in the input data received from the encoder (or encoded input string as discussed above in relation to FIG. 5A). Additionally, the literal index is initialized to the length of the input. Step 806. That is, the length of the final output produced from the encoding algorithm 500 is identified and the literal index for decompression is initialed to the identified length. The literal index is updated upon reading literal characters in the input data received from the encoder. In Step 808, the control characters and literal characters are read from the input string. That is, the control characters are read from the beginning of the string and literal characters are read from the end. As discussed above, the control index and the literal index are updated based upon the reading in Step 808. In Step 810, it is determined whether recompression was used at the conclusion of the encoding algorithm 500. If recompression was used, decompression is complete when the control index is greater than the literal index at the time of the first recompression. Step 812. If recompression did not occur in the encoding algorithm 500, decompression is complete when the control index is greater than the literal index. Step 814.

In other non-limiting examples, in order to showcase the steps of the systems and methods discussed herein, below please find examples depicting the steps for performing the processes discussed herein. As discussed above and noted below, the output of the encoding algorithm 500 (or compression resulting in the compressed URL) is the control string with the reversed literal string concatenated to it. In each round of the examples discussed below, the characters in the control string are followed by the meaning of those characters in parentheses. Additionally as noted above, the dictionary size is limited to 128 characters. Note, the dictionary does not grow to that length in the examples, as the examples are for illustrative and explanatory purposes. However, when the dictionary does reach the maximum size of 128 characters, data (or characters) is removed from the beginning of the dictionary respective of each character being appended to the end of the dictionary, thereby maintaining a size (or length) less than or equal to the maximum size of 128 characters.

Example 1

Initial Strings

URL: zz/common/assets/css/global_4741.css
Dictionary: shared/common/ued/assets/css/.css&min.js&
Round 1
URL: Control:$ (2)IX (38,8)
Literal: zz
Dictionary: shared/common/ued/assets/css/.css&min.js&zz/common/

In the first round, the string 'zz' is not present in the dictionary. '$' is the control character that indicates that 2 characters are being written to the literal string. The next 8 characters in the URL, '/common/', are found in the dictionary, 38 characters from the end; 'IX' encodes this fact. Note, that 'IX' actually encodes 37, 5. There is no reason to encode an offset of 0, because there is not a character there. Therefore, 0 indicates the last character of the dictionary; thus, 37 means 38 characters from the end. The minimum allowed run length is 3, which is encoded as a run of 0, meaning that a run of 8 gets encoded as 5. Also note that '/common/' is 38 characters from the end of the dictionary after 'zz' has been written to it. This allows a dictionary match of the just-written literal.
Round 2
URL: zz/common/assets/css/global_4741.css
Control: $IXHj (34,11)
Literal: zz
Dictionary: shared/common/ued/assets/css/.css&min.js&zz/common/assets/css/

In the second round, a dictionary match is found immediately. Nothing is written to the literal string, and the only thing written to the control string is the dictionary match.
Round 3
URL: zz/common/assets/css/global_4741.css
Control: $IXHj/(11)J! (45,4)
Literal: zzglobal_4741

Dictionary: shared/common/ued/assets/css/.css&min.js&zz/common/assets/css/global_4741.css The third round again finds a string which is not in the dictionary followed by a string that is. Thus, the appropriate additions to the literal and control strings are made.

Final Output: $IXHj/J!1474 labolgzz

The compressed URL consists of the control string with the reversed literal string appended. In this example, it's about 58% of the size of the original URL. It should be noted that tests on real-world data show that the compressed URL is usually around 30% the size of the original. Therefore, an expected ration of 3:1 can be achieved.

Example 2

Initial Strings

URL: a/lib/yui/3.3.0/build/substitute/substitute-min.js&a/lib/yui/3.3.0/build/yui/intl-base-min.js
Dictionary: shared/common/ued/assets/css/.css&min.js&
Round 1
URL: a/lib/yui/3.3.0/build/substitute/substitute-min.js&a/lib/yui/3.3.0/build/yui/intl-base-min.js
Control: @(18)<(14)Ca (11,11)
Literal: a/lib/yui/3.3.0/build/substitute
Dictionary: shared/common/ued/assets/css/.css&min.js&a/lib/yui/3.3.0/build/substitute/substitute Here, the literal match was longer than the maximum encodable length; therefore, it gets encoded as two consecutive literal strings: the first of length 18 and the second of length 14. Also, note that the dictionary match was part of the literal—this is the dictionary match of the just-written literal mentioned in Example 1 above.
Round 2
URL: a/lib/yui/3.3.0/build/substitute/substitute-min.js&a/lib/yui/3.3.0/build/yui/intl-base-min.js
Control: @<CaLa (51,20)
Literal: a/lib/yui/3.3.0/build/substitute
Dictionary: shared/common/ued/assets/css/.css&min.js&a/lib/yui/3.3.0/build/substitute/substitute-min.js&a/lib/yui/3.

In rounds two, three and four, there is no literal match, so only the dictionary match is encoded.
Round 3
URL: a/lib/yui/3.3.0/build/substitute/substitute-min.js&a/lib/yui/3.3.0/build/yui/intl-base-min.js
Control: @<CaLaLQ (51,10)
Literal: a/lib/yui/3.3.0/build/substitute
Dictionary: shared/common/ued/assets/css/.css&min.js&a/lib/yui/3.3.0/build/substitute/substitute-min.js&a/lib/yui/3.3.0/build/
Round 4
URL: a/lib/yui/3.3.0/build/substitute/substitute-min.js&a/lib/yui/3.3.0/build/yui/intl-base-min.js
Control: @<CaLaLQDc (16,4)
Literal: a/lib/yui/3.3.0/build/substitute
Dictionary: shared/common/ued/assets/css/.css&min.js&a/lib/yui/3.3.0/build/substitute/substitute-min.js&a/lib/yui/3.3.0/build/yui/
Round 5
URL: a/lib/yui/3.3.0/build/substitute/substitute-min.js&a/lib/yui/3.3.0/build/yui/intl-base-min.js
Control: @<CaLaLQDc+(8)Jg (43,8)
Literal: a/lib/yui/3.3.0/build/substituteintl-bas Dictionary: shared/common/ued/assets/css/.css&min.js&a/lib/yui/3.3.0/build/substitute/substitute-min.js&a/lib/yui/3.3.0/build/yui/intl-base-min.js Round 5 is another 'normal' round, consisting of a literal followed by a dictionary match.

Final Output: @<CaLaLQDc+Jgsab-ltnietutitsbus/dliub/0.3.3/iuy/bil/a

Example 3

Initial Strings

URL: aaaaaaaaaaaabababababa
Dictionary: shared/common/ued/assets/css/.css&min.js&
Round 1
URL: aaaaaaaaaaaabababababa
Control: !(1)AI (1,11)
Literal: a
Dictionary: shared/common/ued/assets/css/.css&min.js&aaaaaaaaaaaa Here, 'a' is in the dictionary, but one character is below the minimum run length, so it gets encoded as a literal. Subsequent 'a's get written to the dictionary as they are encountered, allowing them to immediately be encoded as a dictionary match of 11 characters.

Round 2
URL: aaaaaaaaaaaabababababa
Control: !AI!(1)AY (2,9)
Literal: ab
Dictionary: shared/common/ued/assets/css/.css&min.js&aaaaaaaaaaaabababababa The second round is similar to the first, but this time, 'b' gets written to the end of the dictionary, allowing subsequent 'ab's to be found.

Final Output: !AI!AYba

FIG. 9 is a block diagram illustrating an internal architecture of a computing device, e.g., a computing device such as server or user computing device, in accordance with one or more embodiments of the present disclosure. FIG. 9 illustrates a computer system upon which some exemplary embodiments of the present disclosure may be implemented. Although computer system 900 is depicted with respect to a particular device or equipment, it is contemplated that other devices or equipment (e.g., network elements, servers, processors) within can deploy the illustrated hardware and components of system 900.

As shown in FIG. 9, internal architecture 900 includes one or more processing units, processors, or processing cores, (also referred to herein as CPUs) 912, which interface with at least one computer bus 902. Also interfacing with computer bus 902 are computer-readable medium, or media, 906, network interface 914, memory 904, e.g., random access memory (RAM), run-time transient memory, read only memory (ROM), media disk drive interface 920 as an interface for a drive that can read and/or write to media including removable media such as floppy, CD-ROM, DVD, media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces and a universal serial bus (USB) interface.

Memory 904 interfaces with computer bus 902 so as to provide information stored in memory 904 to CPU 912 during execution of software programs such as an operating system, application programs, device drivers, and software modules that comprise program code, and/or computer executable process steps, incorporating functionality described herein, e.g., one or more of process flows described herein. CPU 912 first loads computer executable process steps from storage, e.g., memory 904, computer readable storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., medium/media 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 928 typically provides information communication using transmission media through one or more networks to other devices that use or process the information. For example, network link 928 may provide a connection through local network 924 to a host computer 926 or to equipment operated by a Network or Internet Service Provider (ISP) 930. ISP equipment in turn provides data communication services through the public, worldwide packet-switching communication network of networks now commonly referred to as the Internet 932.

A computer called a server host 934 connected to the Internet 932 hosts a process that provides a service in response to information received over the Internet 932. For example, server host 934 hosts a process that provides information representing video data for presentation at display 910. It is contemplated that the components of system 900 can be deployed in various configurations within other computer systems, e.g., host and server.

At least some embodiments of the present disclosure are related to the use of computer system 900 for implementing some or all of the techniques described herein. According to one embodiment, those techniques are performed by computer system 900 in response to processing unit 912 executing one or more sequences of one or more processor instructions contained in memory 904. Such instructions, also called computer instructions, software and program code, may be read into memory 904 from another computer-readable medium 906 such as storage device or network link. Execution of the sequences of instructions contained in memory 904 causes processing unit 912 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 900. Computer system 900 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 902 as it is received, or may be stored in memory 904 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, at a computing device, an input data string, the input data string comprising a plurality characters;
   initializing, via the computing device, a dictionary with a plurality of characters based in part upon the input data string; and
   encoding the input data string based in part upon the dictionary, said encoding comprises:
   comparing, via the computing device, the characters of the input data string with the characters of the dictionary, said comparing comprising sequentially traversing the input data string and the dictionary, and comparing each character in the input data string with each dictionary character;
   identifying, via the computing device, a first string, said first string identified by determining a match between at least one consecutive character in the input data string and at least one character in the dictionary;
   writing, via the computing device, the first string to a control output string;
   identifying, via the computing device, a second string, said second string comprising at least one consecutive character in the input data string not present within the dictionary;
   writing, via the computing device, the second string to a literal output string; and
   generating, via the computing device, an encoded output string based on the control output string and the literal output string.

2. The method of claim 1, wherein writing the first string to the control output string comprises:
   converting the first string to a first alpha-numeric representation, said first alpha-numeric representation comprises a first number and a second number, said first number representing the number of characters from the end of the dictionary from where the first string was identified, said second number representing the length of the first string; and
   writing the first string to the control output string based on said first alpha-numeric representation.

3. The method of claim 2, further comprising:
   determining the length of the first string;
   wherein if the length of the first string is less than 3 characters, individually writing each character in the first string to the dictionary, said writing each character comprises appending each character to the dictionary; and
   wherein if the length of the first string is at least 3 characters, writing the number of characters in the first string to the literal output string and writing the characters in the first string to the control output string.

4. The method of claim 2, wherein writing the second character to the literal output string comprises:
   converting the second string to a second alpha-numeric representation, said second alpha-numeric representation comprises a number of characters in the second string; and
   writing the second string to the control output string based on the second alpha-numeric representation, wherein said second alpha-numeric representation is prepended to the first alpha-numeric representation in the control output string.

5. The method of claim 1, wherein said encoding is repeated until all of the characters in the input data string have been compared against the dictionary.

6. The method of claim 1, further comprising:
appending the literal output string to the dictionary;
appending the control output string to the dictionary, said control output string is appended to the appended literal output string within the updated dictionary, wherein upon repetition of said encoding, the updated dictionary is utilized for subsequent comparisons against remaining characters in the input data string that have yet to be compared against the dictionary, said subsequent comparisons occur until all of the characters in the input data string have been compared against the dictionary.

7. The method of claim 6, wherein the dictionary is initialized based upon expected characters comprised within the input data string, the dictionary comprising 128 characters, wherein upon the dictionary growing in length, if the dictionary length exceeds 128 characters, a first character in the dictionary is removed for every character appended to the dictionary.

8. The method of claim 6, wherein generating the encoded output string comprises:
reversing the order of the literal output string; and
appending the reversed literal output string to the control output string.

9. The method of claim 1, wherein the input data string is a URL.

10. The method of claim 1, wherein the control output string comprises 82 legal and unambiguous alpha-numeric characters.

11. The method of claim 8, wherein the encoded output string is read during decoding.

12. A non-transitory computer-readable storage medium tangibly encoded with computer executable instructions, that when executed by a processor associated with a computing device, perform a method comprising:
receiving an input data string, the input data string comprising a plurality characters;
initializing a dictionary with a plurality of characters based in part upon the input data string; and
encoding the input data string based in part upon the dictionary, said encoding comprises:
comparing the characters of the input data string with the characters of the dictionary, said comparing comprising sequentially traversing the input data string and the dictionary, and comparing each character in the input data string with each dictionary character;
identifying, a first string, said first string identified by determining a match between at least one consecutive character in the input data string and at least one character in the dictionary;
writing the first string to a control output string;
identifying a second string, said second string comprising at least one consecutive character in the input data string not present within the dictionary;
writing the second string to a literal output string; and
generating an encoded output string based on the control output string and the literal output string.

13. The non-transitory computer-readable storage medium of claim 12, wherein writing the first string to the control output string comprises:
converting the first string to a first alpha-numeric representation, said first alpha-numeric representation comprises a first number and a second number, said first number representing the number of characters from the end of the dictionary from where the first string was identified, said second number representing the length of the first string; and
writing the first string to the control output string based on said first alpha-numeric representation.

14. The non-transitory computer-readable storage medium of claim 13, further comprising:
determining the length of the first string;
wherein if the length of the first string is less than 3 characters, individually writing each character in the first string to the dictionary, said writing each character comprises appending each character to the dictionary; and
wherein if the length of the first string is at least 3 characters, writing the number of characters in the first string to the literal output string and writing the characters in the first string to the control output string.

15. The non-transitory computer-readable storage medium of claim 13, wherein writing the second character to the literal output string comprises:
converting the second string to a second alpha-numeric representation, said second alpha-numeric representation comprises a number of characters in the second string; and
writing the second string to the control output string based on the second alpha-numeric representation, wherein said second alpha-numeric representation is prepended to the first alpha-numeric representation in the control output string.

16. The non-transitory computer-readable storage medium of claim 12, wherein said encoding is repeated until all of the characters in the input data string have been compared against the dictionary.

17. The non-transitory computer-readable storage medium of claim 12, further comprising:
appending the literal output string to the dictionary;
appending the control output string to the dictionary, said control output string is appended to the appended literal output string within the updated dictionary, wherein upon repetition of said encoding, the updated dictionary is utilized for subsequent comparisons against remaining characters in the input data string that have yet to be compared against the dictionary, said subsequent comparisons occur until all of the characters in the input data string have been compared against the dictionary.

18. The non-transitory computer-readable storage medium of claim 17, wherein generating the encoded output string comprises:
reversing the order of the literal output string; and
appending the reversed literal output string to the control output string.

19. A system comprising:
a processor;
a non-transitory computer-readable storage medium for tangibly storing thereon program logic for execution m logic comprising:
receiving logic executed by the processor for receiving an input data string, the input data string comprising a plurality characters;
initializing logic executed by the processor for initializing a dictionary with a plurality of characters based in part upon the input data string; and
encoding logic executed by the processor for encoding the input data string based in part upon the dictionary, said encoding comprises:
comparing logic executed by the processor for comparing the characters of the input data string with the characters of the dictionary, said comparing comprising sequentially traversing the input data string and the dictionary, and comparing each character in the input data string with each dictionary character;
identifying logic executed by the processor for identifying, a first string, said first string identified by determining a match between at least one consecutive character in the input data string and at least one character in the dictionary;
writing logic executed by the processor for writing the first string to a control output string;
identifying logic executed by the processor for identifying a second string, said second string comprising at least one consecutive character in the input data string not present within the dictionary;
writing logic executed by the processor for writing the second string to a literal output string; and
generating logic executed by the processor for generating an encoded output string based on the control output string and the literal output string.

\* \* \* \* \*